United States Patent [19]
Jackson

[11] 3,947,361
[45] Mar. 30, 1976

[54] FILTER
[76] Inventor: Clifford E. Jackson, 10 Brant St. East, Orillia, Ontario, Canada
[22] Filed: June 24, 1974
[21] Appl. No.: 482,625

Related U.S. Application Data
[63] Continuation of Ser. No. 302,243, Oct. 30, 1972, abandoned.

[52] U.S. Cl. ............... 210/391; 210/402; 210/406; 210/410
[51] Int. Cl.² ......................................... B01D 33/06
[58] Field of Search ...... 162/60; 210/391, 402, 403, 210/404, 406, 409, 410, 416, 489, 493, 494

[56] References Cited
UNITED STATES PATENTS

| | | | |
|---|---|---|---|
| 1,133,944 | 3/1915 | Faber | 210/402 |
| 1,878,998 | 9/1932 | Akins | 210/402 X |
| 2,510,254 | 6/1950 | Richter | 210/402 X |
| 2,722,315 | 11/1955 | Hapman | 210/402 |
| 2,725,145 | 11/1955 | Mylius | 210/402 |
| 3,452,874 | 7/1969 | Keller et al. | 210/404 X |
| 3,500,991 | 3/1970 | Vogt | 210/406 X |
| 3,519,137 | 7/1970 | Nilsson | 210/403 |
| 3,606,735 | 9/1971 | Baigas, Jr. | 210/404 X |
| 3,638,797 | 2/1972 | Heckmann | 210/402 X |

Primary Examiner—Charles N. Hart
Assistant Examiner—Robert H. Spitzer
Attorney, Agent, or Firm—Westell & Hanley

[57] ABSTRACT

The cylindrical filter surface of a drum filter is increased in effective area by providing radial inward and outward undulations in the general cylindrical shape instead of the cylindrical surface of the prior art.

2 Claims, 4 Drawing Figures

FILTER

This is a continuation of application Ser. No. 302,243, filed Oct. 30, 1972, now abandoned.

This invention relates to external rotary drum vacuum filters which comprise a cylindrical rotatable drum-like device where the cylinder is rotated about its axis of revolution. The cylindrical portion is covered with a filter medium designed to separate solids from liquids in mixtures of these components passing therethrough from the outside to the inside of a filter, with the ends closed to an extent to ensure, in the specific design of the device, that the mixture to be filtered passes through the filter media. The 'filter media' will usually be a filter cloth, of a weave and material to perform the necessary filter operation with the components used.

In this application, the terms used are characteristic of the mining industry. Thus the device including the filter media for separating liquid from solid is referred to as a filter in the mining industry. However, the invention is applicable to filters of the type described in other fields, including the pulp and paper industry. In the pulp and paper industry the filtering device is sometimes called a 'washer' and the invention extends to such a washer which is within the scope of the claims. Similarly, the term 'slurry' referring to a mixture of liquid and solid is intended to include any such mixture to be filtered including a 'pulp'; and the solids formed through filtration on the filter medium include a 'cake' as described and a 'sheet' which is the equivalent term in the pulp and paper industry.

The filter is used by applying a pressure differential from atmospheric to sub-atmospheric (hence the term 'vacuum filter') across the filter media to cause the flow from the outside to the inside of the filter which allows the filtering action to take place. Filters operating in the latter manner and rotating as they operate are called rotary vacuum drum filters. In such a filter the mixture is supplied radially outward of the cylinder and the filtrate passes inwardly through the filter media.

With filters of the type described in the preceding paragraph, the area of the filter media is a direct measure of the capacity of the filter. Thus such a filter is built as large as possible to reduce the number of installations required, and the limitations on size are therefore dictated by plant dimensions and by the economies of the auxiliary equipment including: the vacuum system, pumps and other auxiliary equipment.

This invention, therefore, is directed to an arrangement which increases the filter area and hence the capacity of a external rotary drum vacuum filter without materially increasing the overall filter size. The invention provides a filter media arranged, not in the conventional smooth cylindrical extent about the drum; but rather in a path which cyclically alternates radially inward and outward of the mean cylindrical path of the filter medium, producing undulations in the filter medium which extend axially of the drum. This can achieve the lengthening of the filter media, for a given cylindrical diameter, a factor of 2 times or more, and supplies a substantial increase in filter area which is reflected in increased filter capacity. The amount of increased capacity beyond a factor of two cannot be stated precisely, as this will vary with a number of extraneous factors, including the ease of dislodging the filter-cake from the filter media and the rapidity with which the filter-cake covers the filter media (particularly the valleys on the higher pressure side of the filter) and reduces to some extent (until discharged) the capacity of the filter. It will be appreciated that the caking of the filter on devices built in accord with the invention will to some extent reduce the filter area as the cake builds up. It will also be appreciated that the reduction in filter area due to the build-up of filter-cake will be minimized when the method and frequency of detaching the filter-cake from the filter medium is optimum.

The invention will extend to shaping of the filter media to simply zig-zag radially inwardly and outwardly of the general cylindrical locus in progressing around the drums and to different arrangements of alternating radially inward and outward deviations from the cylindrical shape.

The advantages of the invention in improving filter capacity will already be obvious. In the application the ancillary and accessory equipment with which the invention is used including: the drum rotation means, the drum mounting, the mixture supply, the filtrate and the filter-cake removal means, are in accord with previously well known and well established techniques, and hence will only be dealt with briefly herein.

In drawings which illustrate a preferred embodiment of the invention:

Figure 2:
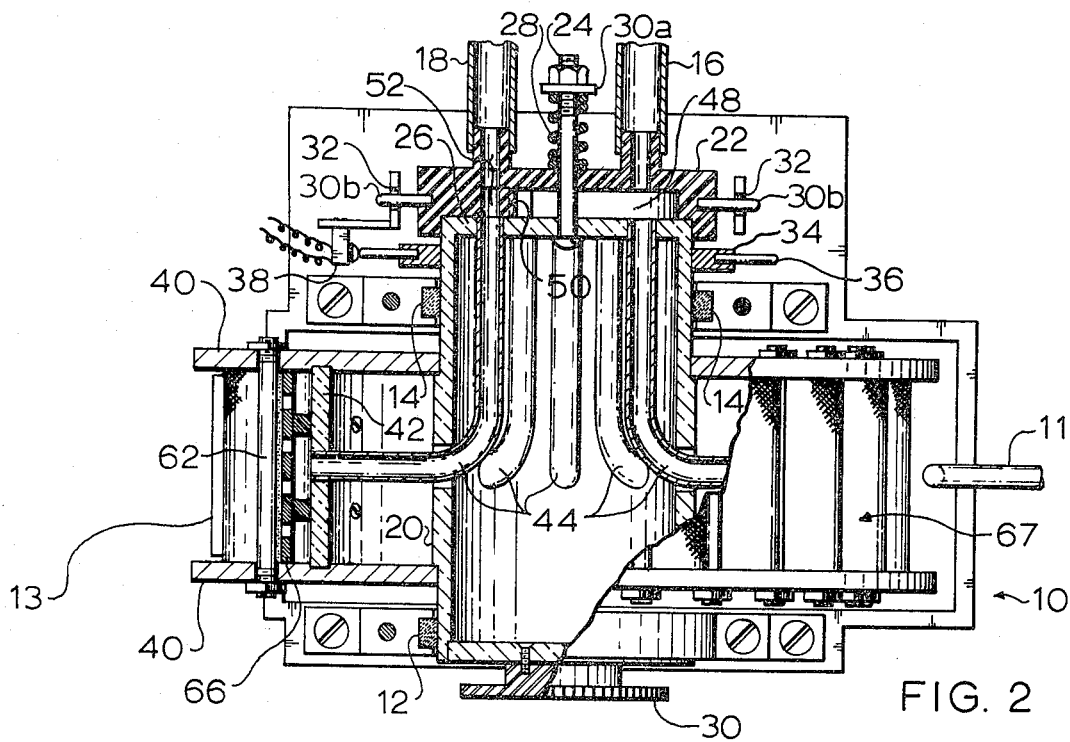
FIG. 2 shows a view along the line 2—2 of FIG. 1.
Figure 1:
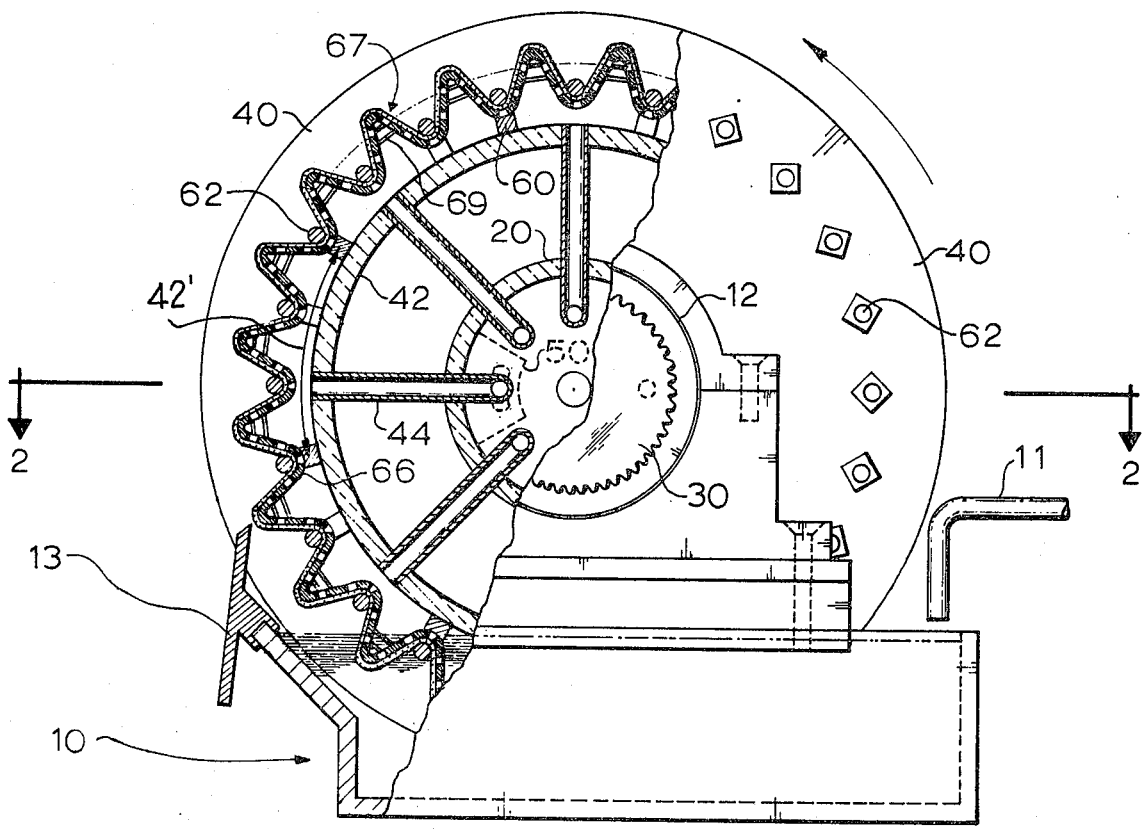
FIG. 1 shows a side cross-section of a rotary external drum filter.

In the drawings: FIG. 1 shows an external rotary drum filter including a tank 10 into which the lower section of the cylindrical drum filter dips in its rotation. Conduit 11 supplies to tank 10 a slurry or pulp of the type being filtered, slurry or pulp being the terms used for most mixture of solid and liquid which are filtered in a drum filter. At some location, adjacent the periphery of the radially outermost extent of the rotating drum, is a deflector blade 13 which approaches the radially outermost portion and serves to deflect to a desired location cake or matted solids formed on the filter media when these have been detached. Such caked solids are referred to as the filter cake or matte. The tank 10 provides bearing mounting 12 and 14 for the drum assembly. For connection at one end of the drum stationary conduits 16 and 18 are respectively provided for withdrawing the filtrate and for supplying air to discharge the cake.

The drum assembly comprises a large hollow tubular shaft 20 mounted in the bearings 12 and 14 and having at one end a drive sprocket or worm wheel 30 for rotation of the drum under the impulsion of a power source, not shown. A spring is provided to press an end cap 22 against the end wall of the shaft 20 (such end wall being commonly known as a 'wear plate') at the end remote from sprocket 30, preferably through the use of an axially mounted pin 24 attached to the end wall 26 of the drum assembly and passing through the end cap and held up compression spring 28 which bears at one end on a plate 30A on the outer end of pin 24 and bears at the other end on the end cap 22 to hold the end cap into sliding but substantial sealing engagement with the end wall of the shaft 20. The end cap is keyed against rotation by pins 30B which rests in slots 32 in the frame.

Figure 3:
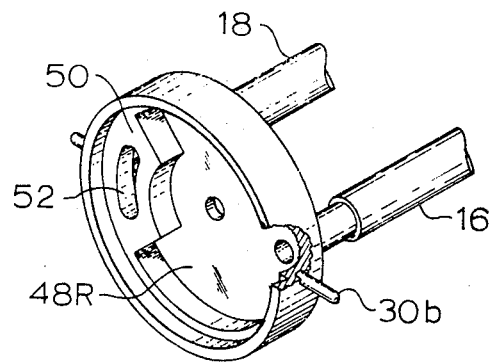
FIG. 3 shows a detail of the invention of the embodiment shown in FIGS. 1 and 2.
Figure 4:
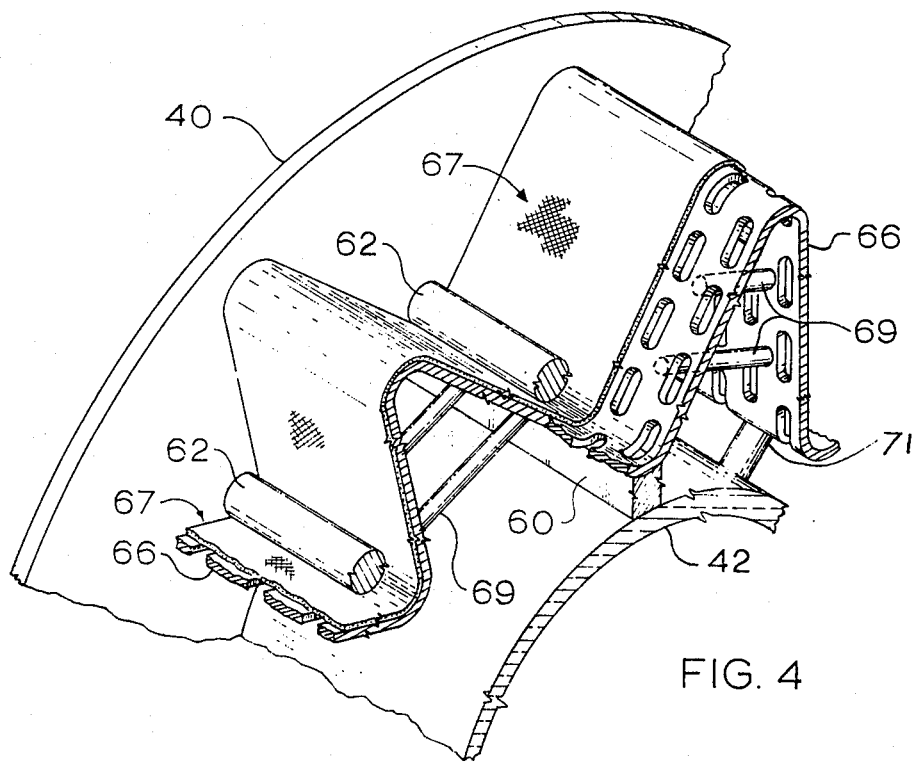
FIG. 4 shows a detail of the device for shaping the filter media.

The end cap 22, shown in FIG. 3 is known in the field of filbers as an automatic filter valve. As explained, the filter valve controls the cyclic use of vacuum and air pressure. The valve is held stationary as the cylindrical filter rotates, and is designed to provide a sealing surface at its periphery which cooperates with a lubricated surface on the center shaft of the filter. Extending outwardly from an exposed portion of the side wall of shaft 20 are pins 36 which are adapted to intermittently actuate a microswitch 38 to provide, through conduits and an air source, not shown, an almost instantaneous air blast at relatively high pressure through conduit 18 to intermittently detach the cake from the filter medium. A pair of plates 40 are mounted to project radially outwardly from the main cylinder wall 42 with the spacing between them defining the axial extent of the filter. The plates 40 mount, near but inward of their outer periphery, a cylindrical wall 42 made up of sections 42 with each section defining an aperture for a filtrate withdrawal conduit 44 which extends inwardly from the peripheral wall 42 to the central shaft 20 and outwardly to an open aperture in the end of cap to communicate in portions of the cycle with a cavity 48 defined by a recess 48R shown best in FIG. 3 and the adjacent end wall of central shaft 20. Recess 48R connects through an aperture in the end cap to tube 16 to the source of sub-atmospheric pressure, i.e. a vacuum pump.

The end cap 22 is designed so that the recess 48R is interrupted by a face 50 designed to contact and substantially seal with the face of shaft 20 end. An aperture 52 through the abutment connects a designed arcuate extent of aperture 52 with the passing openings of conduits 44 and the aperture 52 is connected at its other end through conduit 18 to a source of air pressure, not shown.

The aperture and outside edges of the face 50 determine, for the rotating drum sections, the initiation and termination of vacuum and air blast application. The face 50 is also dimensioned to prevent serious loss of air and vacuum by avoiding connection between spaces subject to air blow pressure and spaces subject to vacuum. During the coincidence of the open end of a conduit 44 with the aperture 52 the pins 36 are arranged on shaft 20 to actuate microswitch 38 to cause through a control system, not shown, the air source to supply air under pressure along members 18, 52 and one of the tubes 44 to detach the filter cake from the filter media. As indicated in the drawings, such detachment occurs when the cake is at the 9:00 to 8:30 position for travel about the drum (counterclockwise as viewed in FIG. 1). The loosened filter cake thus falls off as it moves downward on the drum to be deflected away from the filter area by deflector blade 13.

The detachment of the filter cake, although ancillary to the main contribution and objects of this invention, does differ from the method used in prior filters. Prior filters of the outside type, having a smooth cylindrical outline, were usually provided with a scraper blade, which although spaced from the location of the filter media without cake, is located sufficiently close to the filter media to scrape off the cake after a predetermined amount of build up. The air blow used, in such conventional arrangements, is sufficient to dislodge the filter cake for cooperation with the scraper. With this invention, the undulation of the filter media prevents a scraping operation. The air blast for detachment is made preferably strong enough to detach the filter cake from the filter media sufficiently that the cake falls to a deflector plate or other means for guiding the detached cake. The air blast is preferably, with this invention, made of shorter duration and shorter 'peaking time'. The above discussion of air detachment with both the conventional and inventive designs, should not obscure the fact that filter cakes to some extent will detach themselves by gravity, and detachment will vary with the density and texture of the filter cake material. Although the timing and pressure of the air detachment blast will differ from prior practise the timing and pressure means used with the invention will be in accord with conventional and well established techniques and are not discussed in detail here.

Projecting outwardly from the section wall 42 are a plurality of short, axially, extending dividers 60 which tend to divide the space inwardly of the filter media into sections to allow withdrawal of the filtrate in a section through the conduit 44 corresponding to such section. A plurality of rods 62 extend axially between the plates 40 located inwardly of the median locus of the filter media and outwardly of section 42. Undulated sections of perforated metal 66, provide a backing for the filter media and are supported on the drum cylinder by any desired means such as short rods 71 projecting outwardly from peripheral wall 42 and held in place by welding to member 42 and form the undulating pattern inwardly and outwardly of the median locus for the filter media cylinder. The undulated sections 66 may be made of other materials than metal, for example, molded rubber, fibre glass, the polypropylenes or other material which will have suitable strength and resistance to the material being supported. The material used will of course be suitably apertured or slotted to allow passage of the filtrate passing through the filter media.

Bridging rods 69, as shown, are welded or otherwise attached to the inside of loops of the member 66 to support and strengthen the member 66 in its undulating shape.

The filter media or filter cloth 67 constructed of material and of a texture well known to those skilled in the art, is applied over the outside of the shaping porous plate 66 and held in place by rods 62 which press the filter media against the plate 66, and press the plate 66 in turn toward the supports. The rods 62 are located at the inward niches of the radial variation of the screen plate 66. Supports for the screen plate 66 are also preferably provided by the outwardly extending dividers 60 which are attached to the inside of the inward loops of the screen plate.

The increase in area provided by the radial and inward and outward undulations of the filter media will readily be apparent. In the embodiment shown, the increase in filter area due to the increased length of the filter media would be approximately twice the filter area or more of a non-undulating filter at the median diameter. It will readily be appreciated that these improved ratios could be increased subject to practical limitations, which would include the rate at which the filter cake would form in the inward niches on the outside of the filter media thereby the filter area until the filter cake is detached.

In operation with the device shown in FIGS. 1-4 rotated slowly through its sprocket or worm wheel, and with slurry or pulp supplied to the filter tank 10 through the conduit 11, and the vacuum continuously applied to conduit 16; the filtrate is continuously drawn through the filter media and withdrawn along these pipes 44 opposite the recess in the end cap. During the travel of individual sections of the drum through a descending portion of their travel through an angle corresponding to the drum end of aperture 52 and to the dotted arc shown in FIG. 1, an air blast, triggered by a pin 36 actuating the microswitch 38, tends to blow the filter cakes off the corresponding arcuate extentd on the outside of the filter media which cakes tend to fall onto the deflector blade. Although the immediately preceding description relates to the use of the inventive, undulating surface filter in the mining industry, the invention also has application in the pulp and paper industry. In the pulp and paper industry there will be used an undulating filter media of the type indicated in FIGS. 1 and 2. Although not shown herein, it is well known that filters in the paper industry are built with a deep feed tank so as to filter very large volumes of water through the filter media for a given revolution of the drum. The higher submergence of the drum necessitates raising the point of discharge to about the 10:00 to 11:00 o'clock position. The pulp filtered would be removed or discharged from the filter as a matte, commonly called a sheet. The matte or sheet does not require a scraper blade but discharge on removal of the sheet is usually effected by providing one or two fluted rolls driven at the correct speed to carry the sheet of pulp off the filter drum.

My invention may also be applied to wood pulp where a similar roll discharge may be used to take the sheet away after it has been dislodged by either a low pressure air blow or by a quick, high pressure, air blow. Steam may be used instead of air for the purpose.

A type of discharge known as a vacuum-discharger may also be used to lift the sheet off the undulations and convey said sheet away from the filter drum.

Another modification to the filter design for pulp and paper would be the substitution of perforated tubes covered with filter media for rods 62, so as to assure even and continuous sheet formation, which is necessary for discharging the sheet by means of driven fluted rolls.

Where, in the embodiment shown the fit between the undulating plate and the end plate is not liquid tight, suitable caulking or sealing (not shown) will be applied to ensure that liquid cannot bypass the filter media.

I claim:

1. In a continuous rotary vacuum drum filter comprising a generally cylindrical shape, wherein the median location of the filter media is located on the cylindrical side as distinct from the end of the cylinder, said filter including a filter media for separating solids from liquids and there are provided means for rotating the filter about the axis of the cylinder;

means forming said filter media into a surface shaped in its progression around said generally cylindrical location to alternate between levels of nodes radially inwardly and radially outwardly disposed from each other, whereby undulations are formed extending axially of the cylinder; and means to supply to the outside of said filter a liquid-solid mixture to be filtered and means to withdraw from the inside of said filter the filtrate;

means allowing the creation of a pressure differential across the filter media due to the provision of atmospheric pressure on said one side and the provision of subatmospheric pressure on said other side;

means for intermittently directing an air blast radially outwardly through said filter media for detaching accumulated filter cake from said filter media;

wherein said filter is designed so that a mixture of liquids and solids are supplied radially outwardly of the filter media, and the liquid filtrate is withdrawn radially inwardly thereof, wherein, said filter media comprises flexible material, and wherein said filter media is shaped by a supporting plate, having passages therethrough and contoured to shape the filter media to form said undulations, when the filter media is arranged along the outside surface thereof, and means retaining the filter media on said surface;

wherein said movement of said filter media away from said supporting plate is limited by rods located adjacent said filter media and on the opposite side of said filter media from the supporting plate and located in the inward nodes of said alternating levels.

2. In a rotary vacuum drum filter as claimed in claim 1 means operable in rotationally sequential sectors of said filter for temporarily reversing said pressure differential.

\* \* \* \* \*